Jan. 12, 1971   J. L. HARNED   3,554,612
ANTILOCK BRAKE CONTROL

Filed Aug. 21, 1968   3 Sheets-Sheet 1

INVENTOR
John L. Harned
BY
Warren D. Hill
ATTORNEY

INVENTOR
John L. Harned
BY
Warren D. Hill
ATTORNEY

United States Patent Office
3,554,612
Patented Jan. 12, 1971

1

3,554,612
ANTILOCK BRAKE CONTROL
John L. Harned, Grosse Pointe Woods, Mich., assignor to General Motors Corporation, Detroit, Mich., a corporation of Delaware
Filed Aug. 21, 1968, Ser. No. 754,252
Int. Cl. B60t 8/08
U.S. Cl. 303—21
9 Claims

ABSTRACT OF THE DISCLOSURE

An electronic control is responsive to wheel acceleration to produce signals for effecting alternating brake release, hold, and application to avoid wheel lock. A wheel velocity error circuit compares a wheel acceleration signal to a reference signal and integrates the difference to control brake release. A similar circuit responsive to the wheel acceleration signal and another reference signal controls brake hold and application. A third circuit varies the reference signals to optimize the control function.

This invention relates to a control for a vehicle brake system of the type which maintains near optimum braking torque to avoid wheel lock-up.

It has previously been proposed in antilock brake controls to compare the velocity of a braked wheel to a preprogrammed reference velocity, such as the velocity of an inertia wheel or the like and to effect braking as a function of some fixed relationship between the actual and the reference velocities and accordingly, such controls lack the necessary flexibility to attain optimum effectiveness in all ranges of operation. Generally, such controls have an inherent time lag between the attainment of the critical velocity relationship and the generation of an output signal for effecting brake release. Such time lags, although minute, can have deleterious effects on system performance. Such prior controls have also generally provided incipient lock-up detection means sensitive to electrical noise or other spurious signals and subject to loss of control in the event that wheel lock-up does occur.

Other such controls have been proposed which do have a rapid response but which require an expenesive proportional valve to control brake pressure in response to a control signal.

It is therefore a general object of this invention to provide in an antilock brake system an electronic control circuit for operating an on-off brake pressure control valve in a manner to achieve proportional control.

It is another object of the invention to provide in an antilock brake system an electronic circuit to control brake pressure in a release-hold-apply mode.

It is a further object of the invention to provide in an antilock brake control system an electronic control having reference parameters which may be varied to optimize system performance.

It is another object of the invention to provide a rapid response incipient wheel lock-up detection circuit having an inherent noise rejection feature.

It is yet another object of the invention to provide an antilock brake control circuit having an inherent wheel lock reset control.

The invention is carried out by providing a circuit for programming a variable reference signal which is a function of a desired wheel deceleration, a circuit for producing a signal which is a function of actual wheel deceleration and a further circuit for comparing the signals and for producing an output signal which represents the amount that the desired wheel velocity exceeds the actual wheel velocity.

2

The invention is further carried out by providing in an antilock brake system an electronic incipient wheel lock-up sensing circuit having as an input a signal proportional to wheel acceleration and having means for providing a reference signal which is a function of optimum deceleration and a circuit for summing and integrating the signals to produce an output which is a function of the difference between the wheel velocity and a velocity which is a function of the reference signal, the output being adapted to effect a partial release of brake pressure. The invention further contemplates including in the system an electronic circuit responsive to the acceleration signal and to a variable reference signal which is a function of optimum acceleration after brake release for integrating the signals to produce an output which is a function of the difference between the wheel velocity and a velocity which is a function of the variable reference signal, the output being adapted to cause the brake pressure to hold at a reduced constant value until the wheel velocity recovers from an incipient lock-up condition and then to effect reapplication of brake pressure.

The above and other advantages will be made more apparent from the following specification taken in conjunction with the accompanying drawings wherein like reference numerals refer to like parts and wherein.

The system in which this invention is utilized follows the well established principle of sensing incipient wheel lock-up when brake pressure is applied to vehicle brakes, then relieving the brake pressure until the wheel accelerates enough to be out of danger of locking and then reapplying the brake pressure. This cycle is repeated as necessary to achieve the desired braking action. This system is particularly well adapted to practice the control principle of the extremal type in which brake pressure sufficient to cause a substantially increased wheel slip is released to permit wheel acceleration and consequent decreasing wheel slip. The brake pressure is then held at a value to permit wheel acceleration and therefore a decrease in wheel slip while maintaining a brake torque on the wheel until the wheel acceleration ceases. The brake apply pressure then again is increased to cause wheel deceleration. This extremal type of control is more fully set forth in the patent application U.S. Ser. No. 658,420 filed Oct. 4, 1967 by D. M. Flory, now Pat. No. 3,441,320.

Figure 1:
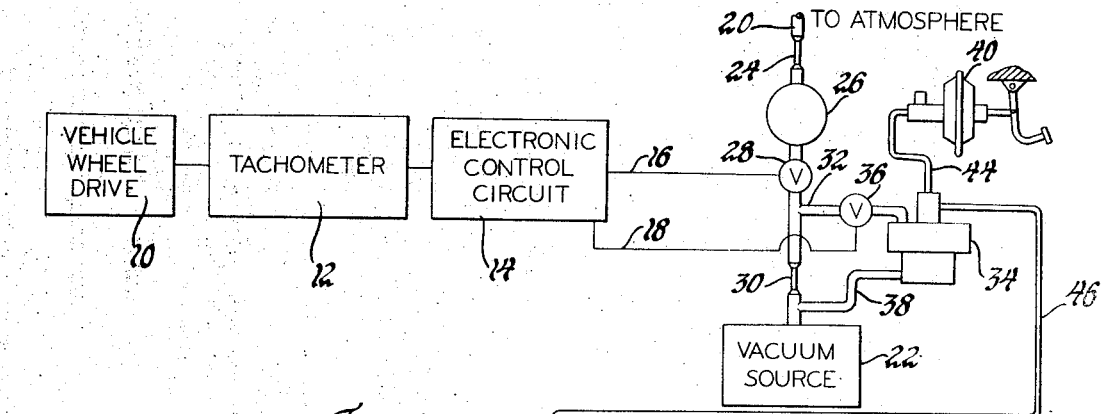
FIG. 1 is a diagrammatic representation of an antilock brake control system according to the invention.

Referring to FIG. 1 for a further description of the general system, a vehicle wheel drive 10 is provided as an information source for the system. The vehicle wheel drive 10 may be a wheel per se, a propeller shaft driving a plurality of wheels or any other vehicle member having a velocity or rotation proportional to wheel velocity. A tachometer 12 is driven by the wheel drive 10 and provides an input signal to an electronic control circuit 14. The electronic control circuit 14 in turn furnishes two signal outputs on conductors 16 and 18. A brake pressure modulating system comprises a combination pneumatic and hydraulic system. The pneumatic portion of the system comprises a tube 20 vented to atmosphere at one end and connected to a vacuum source 22 which may be the vehicle engine manifold at the other end. The tube 20 contains in series a restricting orifice 24 near the vent to atmosphere, a pressure accumulator 26, a normally closed electrically operated release valve 28 controlled by the output signal on conductor 16 and a second restricting orifice 30. A branch tube 32 is connected to the tube 20 at a point between the valve 28 and the orifice 30 and leads to a pressure modulator 34. The branch tube 32 contains a normally open electrically operated hold valve 36 controlled by the output signal on conductor 18. Still another pneumatic tube 38 connects the modulator 34 with the vacuum source. The hydraulic portion of the system includes a manually operated conventional master cylinder 40 for supplying brake pressure to conventional vehicle brakes 42 through a first supply line 44, the modulator 34 and a second supply line 46. The structure and operation of the modulator 34 is fully described in the abovementioned Flory application and no further description herein is necessary except to point out its function. Normally vacuum pressure from the source 22 is applied through the tubes 38 and 32 to both sides of the modulator 34 and in this condition, the modulator 34 transfers the brake pressure from the master cylinder 40 to the brakes 42 without any modulation. However, when air pressure is supplied from atmosphere to the modulator 34 through the tubes 20 and 32, the modulator will first isolate the brakes 42 from the master cylinder 40 and will then relieve pressure from the brakes 42 to a degree determined by the amount of air pressure supplied through tube 32. When the hold valve 36 is closed the modulator 34 will hold the brake pressure constant. If the valve 28 is then closed and the valve 36 is opened, the brake pressure will tend to assume the master cylinder pressure.

In operation of the system in general, a wheel velocity signal is supplied to the electronic control circuit 14 by the tachometer 12. During normal braking of the vehicle, the electronic control circuit is ineffective to cause any modulation of pressure applied to the brakes 42. However, during a panic braking condition, the applied braking pressure is so great that the wheel begins to approach a lock-up condition and the electronic control circuit 14 produces an output on conductor 16 causing the valve 28 to open. Then, air from the accumulator 26 rapidly enters the modulator 34 to quickly relieve some of the pressure on the brakes 42 and then additional air bleeding through the orifice 24 effects further relief of brake pressure. The resulting decrease of brake pressure allows the wheel to accelerate and when such acceleration begins, the electronic control circuit 14 produces an output on the conductor 18 to close the valve 36, thereby preventing further air pressure change in the modulator 34 and causing the modulator 34 to maintain a constant brake pressure. Finally, as the wheel velocity recovers, the electronic control circuit 14 removes the signals from conductors 16 and 18 to close the release valve 28 and open the hold valve 36 so that the air pressure within the modulator 34 will bleed off through the restricting orifice 30 to the vacuum source 32 to allow an increase of brake pressure and a wheel deceleration to initiate the cycle again if necessary.

INERTIA WHEEL VELOCITY REFERENCE PRINCIPLE

Figure 2:
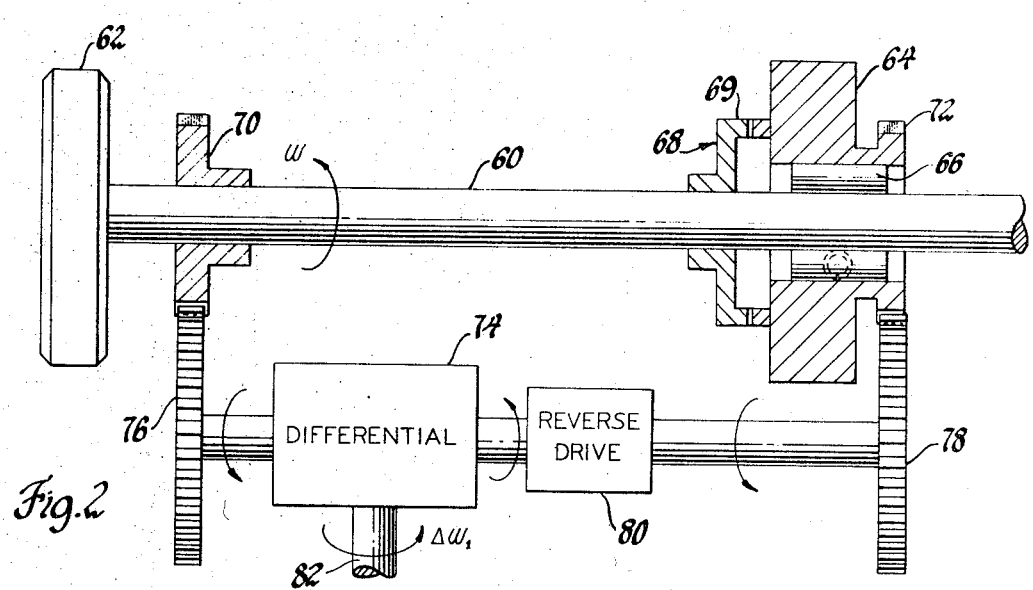
FIG. 2 is a diagrammatic representation of a mechanical analog of the inertia wheel velocity reference principle.

The electronic control circuit 14 utilizes a control principle called herein the inertia wheel velocity reference (IWVR) principle which provides precise control and rapid response. The IWVR principle is illustrated in FIG. 2 by a mechanical analog wherein a shaft 60 rotates with a wheel 62 at a velocity $\omega$ of the wheel. An inertia wheel or flywheel 64 is mounted on the shaft 60 by an overrunning clutch 66 so arranged that the inertia wheel 64 will be driven by the shaft 60 when the wheel velocity $\omega$ is increasing. The inertia wheel 64 is further driven by the shaft through a slip clutch 68 having a driving member 69 secured to the shaft 60. The slip clutch 68 is of the type which transmits a maximum torque T and if that torque T is exceeded slipping will occur between the driving member 69 and the inertia wheel 64. With this arrangement then, the velocity of the inertia wheel 64 will always follow the velocity of the wheel 62 when the latter is accelerating and will also follow the velocity of wheel 62 when the latter is decelerating, provided that the deceleration does not create a torque in the slip clutch in excess of the value T. When deceleration of the wheel 62 does exceed that value, the inertia wheel 64 will overrun the shaft 60 but will decelerate at a constant rate due to the constant torque T or drag applied thereto by the slip clutch 68. The deceleration rate of the inertia wheel 64 represents the optimum wheel deceleration within the design limitation of the system. Similarly, the velocity of the decelerating wheel represents the optimum wheel velocity profile within design limitations. The shaft 60 carries a gear 70 and the inertia wheel 64 carries a gear 72. These gears 70 and 72 are connected to a differential 74 through suitable gear trains comprising gears 76, 78 and a reverse drive 80. The differential 74 has an output 82 whih will rotate at a velocity $\Delta\omega_1$ which is the difference between the wheel velocity $\omega$ and the velocity of the inertia wheel. Thus, when the wheel 62 and the inertia wheel 64 rotate in synchronism, the differential output $\Delta\omega_1$ will instantly assume a value equal to the velocity of 64 exceeds that of the wheel 62 $\Delta\omega_1$ will equal the difference in velocities. It will be seen then that torque T of the slip clutch 68 can be so selected that during normal braking $\Delta\omega_1$ will equal zero, but during panic braking when the wheel 62 experiences abnormal deceleration, the slip clutch 68 will slip and $\Delta\omega_1$ will assume a finite value $\Delta\omega_1$ which can be used as a control parameter. It should be noted that the value $\Delta\omega_1$ is instantaneously responsive to abnormal deceleration of wheel 62 and reflects the deviations of the wheel velocity $\omega$ from the programmed reference velocity of the inertia wheel 64. For example, should wheel 62 come to an abrupt stop, $\Delta\omega_1$ will instantly assume a value equal to the velocity of the inertia wheel 64 and, so long as the wheel 62 remains stopped, $\Delta\omega_1$ will gradually decrease as the velocity of the inertia wheel 64 decreases due to the torque T.

Figure 3:
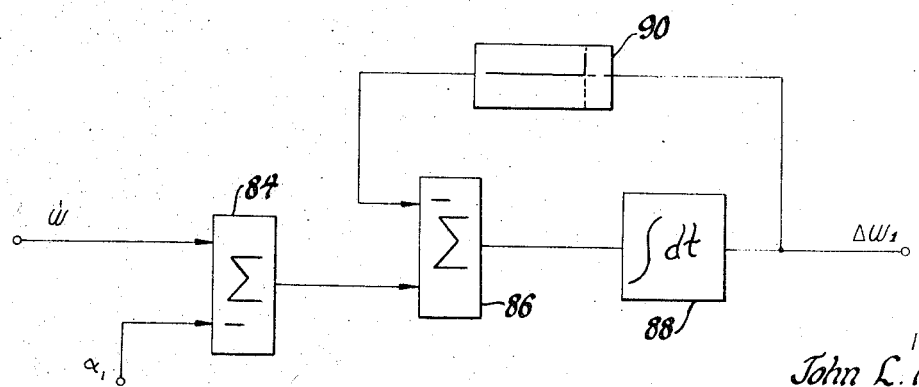
FIG. 3 is a functional diagram of the mechanical analog of FIG. 2.

A functional diagram of the mechanical analog is depicted in FIG. 3. This functional model is mathematically equivalent to the mechanical analog of FIG. 2. The input is in the form of the acceleration $\dot{\omega}$ of the wheel 62 and combined at a summer 84 with another deceleration input $\alpha_1$ which corresponds to the value of torque T of the slip clutch 68 divided by the inertia of wheel 64 and represents the optimum wheel deceleration during braking. The output of summer 84 is fed through a second summer 86 to an integrator 88. The output of the integrator then is $\Delta\omega_1$. A feedback of $\Delta\omega_1$ to the summer 86 through a limit stop 90 assures that the value of $\Delta\omega_1$ cannot go positive. The limit stop 90 therefore represents the overrunning clutch. It will thus be seen that starting from a condition of $\omega=0$, when $\dot{\omega}$ becomes positive, the integrator output $\Delta\omega_1$ will remain zero due to the action of the limit stop 90. When $\dot{\omega}$ is negative but does not exceed the value of $\alpha_1$, $\Delta\omega_1$ still remains zero. If, however, $\dot{\omega}$ becomes more negative than $\alpha_1$, the difference between $\dot{\omega}$ and $\alpha_1$ will be integrated to produce a finite value $\Delta\omega_1$ and $\Delta\omega_1$ will be generated without delay.

ELECTRONIC CONTROL SYSTEM

Figure 4:
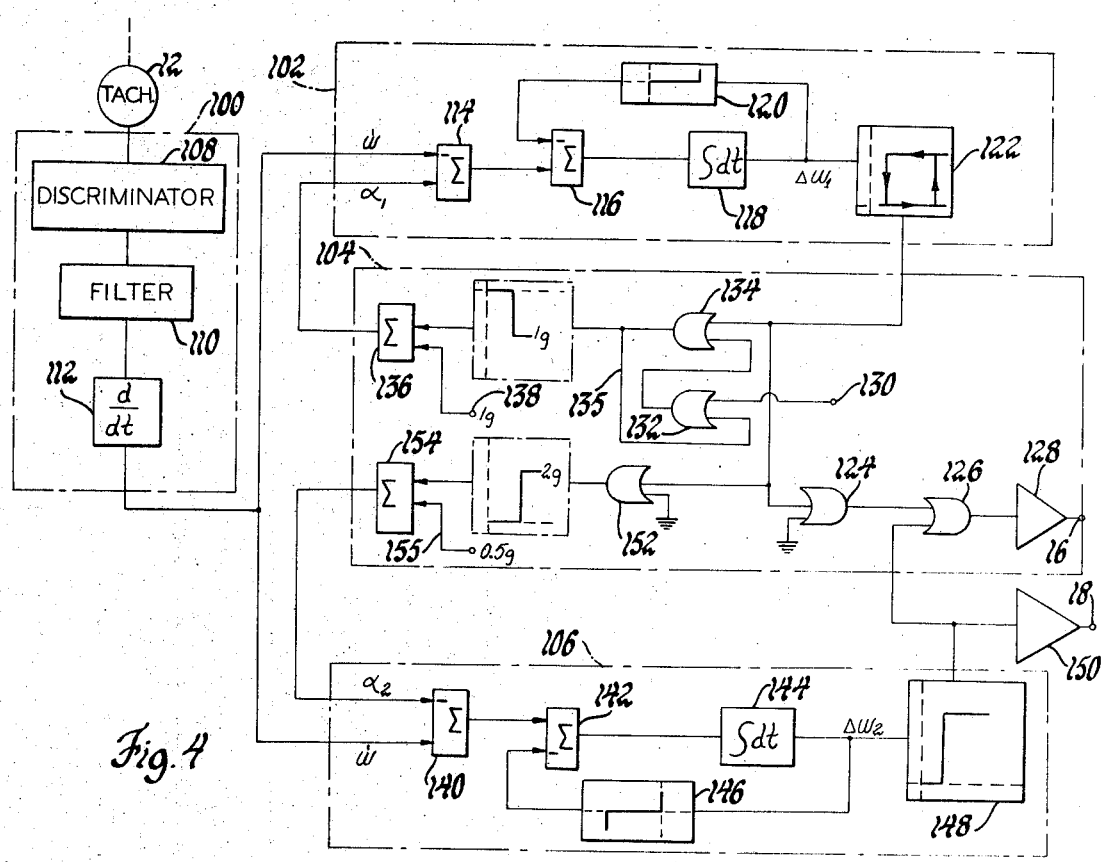
FIG. 4 is a logic and block diagram of the electronic control circuit according to the invention.
Figure 6:
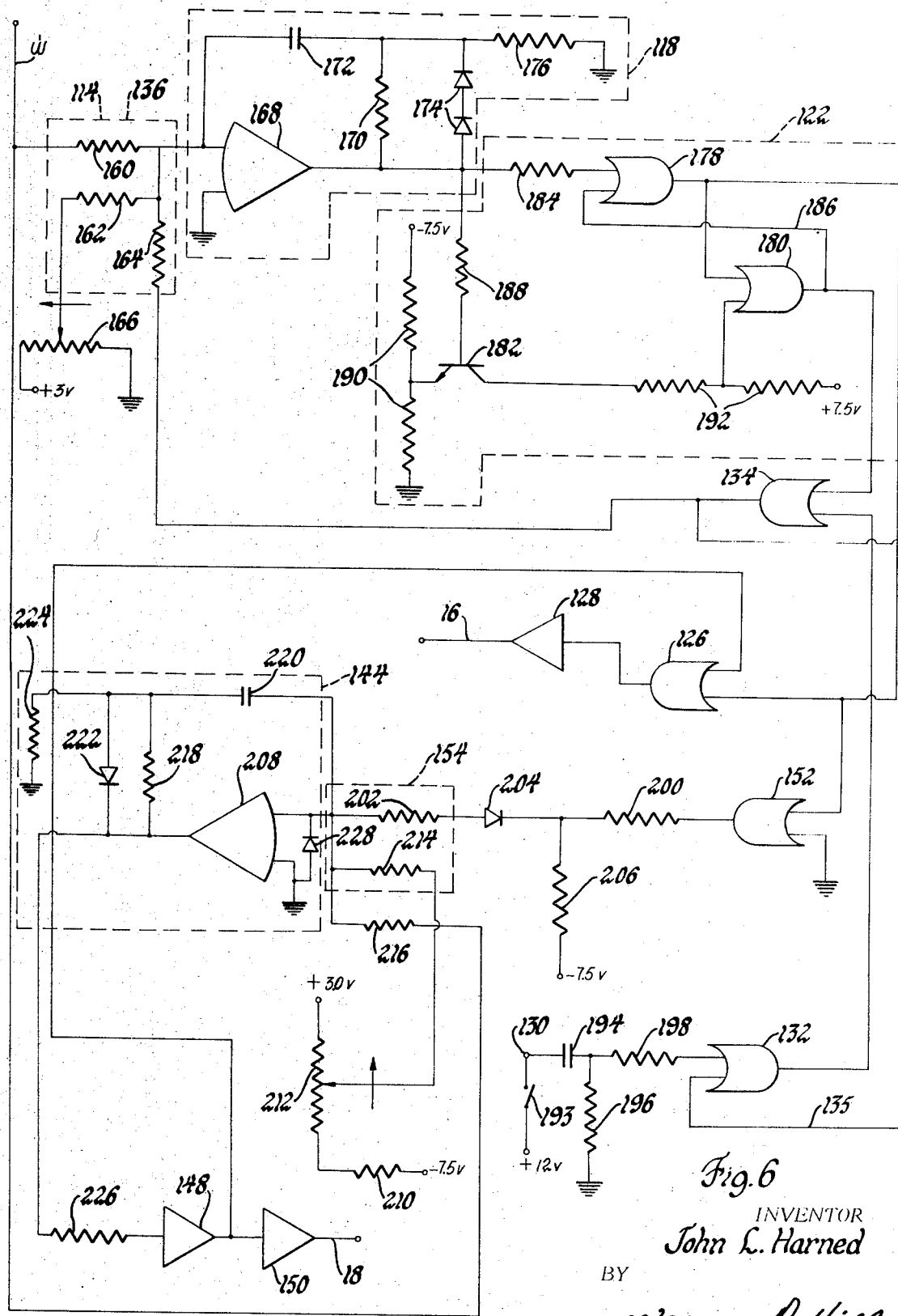
FIG. 6 is a schematic diagram of the circuit of FIG. 4 according to the invention.

For clarity, the electronic control system is first shown in FIG. 4 in the form of a block diagram and is again shown schematically in FIG. 6. The electronic control circuit 14 comprises an input circuit 100, a wheel velocity error circuit 102, and a control logic circuit 104 and a pressure hold circuit 106. A wheel speed sensor or tachometer 12 such as a well known toothed wheel variable reluctance electromagentic transducer produces an alternating output having a frequency proportional to the wheel speed. The alternating signal is changed to a DC signal by a discriminator 108 which is a frequency-to-voltage converter and is smoothed by filter 110 to produce a DC signal $\omega$ having an amplitude proportional to frequency and hence to wheel velocity. The signal $\omega$ is fed to a differentiator 112 which provides an output of wheel acceleration $\dot\omega$. The output $\dot\omega$ is fed to the wheel velocity error circuit 102 and particularly to a summer 114 where it is combined with a deceleration threshold signal $\alpha_1$. The deceleration threshold signal $\alpha_1$, like the torque T of the mechanical analog, represents (within the design limitations of the system) the optimum wheel deceleration during braking, and of course is the time derivative of the optimum wheel velocity profile. The composite output of the summer 114 is then supplied via a summer 116 to an integrator 118 which produces the output $\Delta\omega_1$. A feedback from the integrator 118 output to the summer 116 has a limit stop 120 for the purpose described previously in the discussion of FIG. 3. As will be seen, in practice a separate limit stop circuit 120 is unnecessary where the integrator 118 includes an operational amplifier which inherently has both positive and negative saturation values to thereby provide a limit stop. The output of integrator 118, $\Delta\omega_1$, is fed to a hysteresis circuit 122 which, as shown diagrammatically, produces an output when $\Delta\omega_1$ reaches a predetermined value and maintains the output until the value of $\Delta\omega_1$ approaches a small value. The output of hysteresis circuit 122 is fed to the control logic circuit 104 and particularly to a NOR gate 124 which has its output connected to a NOR gate 126. Assuming the latter gate 126 has no other input, the gate 126 will have an output triggering an amplifier 128 which in turn will have an output on conductor 16 to open the release valve 28 whenever the hysteresis circuit 122 has a positive output.

The control logic circuit 104 further includes means for establishing the deceleration threshold signal $\alpha_1$. A high level threshold input line 130 is energized by a positive pulse when brake pressure is first manually applied. Preferably, the input line 130 is connected to the brake light circuit to be energized when the brake pedal is operated. The input line 130 leads to NOR gate 132 which has its output connected to the input of NOR gate 134. The output of NOR gate 134 is applied by conductor 135 to the input of NOR gate 132 to hold the latter off and consequently hold NOR gate 134 on for as long as the output of the hysteresis circuit 122 remains zero. The output of NOR gate 134 is connected to a summer 136 which in turn is connected to the summer 114. As indicated diagrammatically, when the output of NOR gate 134 is energized, a signal equivalent to a deceleration of −1g is applied to the summer 136. In addition, a second input 138 to the summer 136 applies a constant signal equivalent to the deceleration of −1 g. The output of the summer 136 will then be equivalent to −2 g deceleration.

In operation, when the brakes are first applied, the output of the hysteresis circuit 122 will be zero momentarily and the high level threshold input 130 will be positive so that the NOR gate 132 will be turned off and the NOR gate 134 will be turned on. Then the output of summer 136 will be equivalent to −2 g deceleration. This value of the deceleration threshold is selected to insure that the wheel is definitely in an incipient lock-up condition before the electronic control circuit becomes effective to modulate the brake pressure. When the output of the hysteresis circuit 122 becomes positive, the NOR gate 134 will be turned off to disable the first input of summer 136 to thereby switch the deceleration threshold $\alpha_1$ to a value equivalent to −1 g deceleration. This value of $\alpha_1$ is maintained throughout the succeeding brake modulating cycle. The ability of the circuit to change values of the deceleration threshold provides the system with a control function heretofore unachieved.

THE PRESSURE HOLD CIRCUIT 106

The pressure hold circuit 106 is responsive to wheel acceleration and after the wheel begins to accelerate due to the release of brake pressure effected by the wheel velocity circuit 102, provides a signal effective to hold the brake pressure constant by closing the hold valve 36. At the same time the release valve 28 is closed. The pressure hold circuit 106 is quite similar to the wheel velocity error circuit 102. In particular, the wheel acceleration signal $\dot\omega$ from the differentiator 112 is fed to a summer 140 where it is combined with an acceleration threshold signal $\alpha_2$. The combined signal then passes through a summer 142 to an integrator 144. The output $\Delta\omega_2$ from integrator 144 is representative of the amount by which the wheel velocity exceeds a preprogrammed constantly increasing reference velocity which is a function of $\alpha_2$. A limit stop feedback circuit 146 serves to inhibit positive output from the integrator 144. Hence the IWVR principle is incorporated in the pressure hold circuit 106. A switching circuit 148 has $\Delta\omega_2$ as its input when $\Delta\omega_2$ reaches a predetermined threshold value, provides a signal which triggers an amplifier 150 to produce an output on conductor 18 for closing the pressure hold valve 36. The signal from the switching circuit 148 is also connected to the input of the NOR gate 126 to turn off that gate thereby closing the release valve 28.

The control logic circuit 104 additionally includes means for adjusting the acceleration threshold $\alpha_2$. There a NOR gate 152 has its input connected to the output of the hysteresis circuit 122 and has its output connected to summer 154 which has a second input 155 equivalent to an accelerator of 0.5g. The output of summer 154, then, supplies the acceleration threshold signal $\alpha_2$ to the summer 140. As shown diagrammatically, the output of NOR gate 152, when it is turned on, provides an additional signal equivalent to 2g to the summer 154. Accordingly, then, the acceleration threshold $\alpha_2$ alternates between the value of 2.5g and 0.5g, depending whether the NOR gate 152 is turned on. The result of this arrangement is that when the output of hysteresis circuit 122 is on, thereby indicating a substantial wheel velocity error $\Delta\omega_1$ the value of $\alpha_2$ will be small so that the pressure hold circuit 106 will be quite sensitive to wheel acceleration when the wheel is recovering from its incipient lock condition. This low value of $\alpha_2$ is selected to be as low as possible without making the pressure hold circuit 106 sensitive to road noise which would give a false indication of acceleration. The low value of $\alpha_2$ results in the brake pressure being held as high as possible during wheel acceleration to provide optimum braking effect and therefore the optimum accelerating velocity profile. When, however, the wheel velocity has nearly recovered, $\Delta\omega_1$ will have become quite small turning off the output of the hysteresis circuit 122 and increasing the acceleration threshold $\alpha_2$ to a large value. The effect of this change in $\alpha_2$ is to rapidly drive $\Delta\omega_2$ to a low value to effect opening of the hold valve 36 to thereby permit an increase of brake pressure.

THE WHEEL VELOCITY ERROR CIRCUIT 102

The wheel velocity error circuit 102, the control logic circuit 104 and the pressure hold circuit 106 are shown in schematic and logic form in FIG. 6. The summers 114 and 136 are shown in combination as input resistors 160, 162 and 164 connected to a common point. The resistor 160 is connected to the input carrying the wheel acceleration signal $\dot\omega$. The resistor 162 is connected to a voltage divider 166 which is connected between a +3 v. source and ground. This voltage divider 166 supplies the normal deceleration threshold signal $\alpha_1$. The resistor 164 is connected to the output of the NOR gate 134 to supply the increased deceleration threshold signal at the beginning of the brake modulation cycle. The integrator 118 comprises an operational amplifier 168 of the type MC1530 for example, having a gain resistor 170 and an integrating capacitor 172 serialy connected between the output and input thereof. A pair of diodes 174 in series are connected across resistor 170. A load resistor 176 is connected between ground and the junction of resistor 170 and capacitor 172. The input of the operational amplifier 168 is connected to the common point of the input resistors 160, 162 and 164.

In operation, assuming that the deceleration threshold is set for $-1g$ which corresponds to 0.4 v., that voltage is supplied to the input of the operational amplifier 168 through the resistor 162. The operational amplifier 168 output voltage is then at the negative saturation of $-6.5$ v. When the amplifier is so saturated, any input value of $\dot{\omega}$ which is more positive than $-0.4$ v. will have no effect on the amplifier 168 output (assuming that resistors 160 and 162 are equal). However, if during braking the vehicle wheel decelerates at a rate more than $-1g$, then $\dot{\omega}$ will become more negative than $-0.4$ v. and the amplifier 168 output voltage $\Delta\omega_1$ will increase at a rate determined by the difference of $\dot{\omega}$ and $\alpha_1$ and the integrator gain which is determined by resistors 160, 170, 176 and capacitor 172 which have values of 100K, 20K, 2K and 0.1 mfd. respectively. The component values are so selected that a drop in wheel speed of approximately 40 r.p.m. will cause the operational amplifier 168 output $\Delta\omega_1$ to increase from $-6.5$ v. to $+0.8$ v. Thus, the sensitivity of the integrator 118 to wheel change is very great giving accurate control during this range of operation. However, the memory capability of the integrator 118 would be small if the same high gain were maintained throughout the integrator range. To increase the memory of the integrator 118 it is designed to be non-linear. At the attainment of $+0.8$ v. level, the diodes 174 conduct and short out the gain resistor 170. This places one side of the capacitor 172 at the amplifier 168 output and reduces integrator 118 gain by a factor of 11. The effect of this change in gain is to allow the integrator 118 to remember large drops of wheel velocity such as occur during wheel lock-up conditions. For example, a drop in wheel velocity of 400 r.p.m. corresponds to the amplifier 168 output change from $+0.8$ v. to $+6.5$ v. which is the positive saturation level of the operational amplifier 168.

The hysteresis circuit 122 of FIG. 4 is shown in FIG. 6 as a pair of NOR gates 178 and 180, a transistor 182 and associated passive elements. The output of the integrator 118 is fed through a resistor 184 to the NOR gate 178 which in turn is connected to the NOR gate 126. The output of the NOR gate 178 is also connected to the input of the NOR gate 180. The output of the latter is connected by feedback conductor 186 to an input of the NOR gate 178. The transistor 182 has its base connected through a limiting resistor 188 to the output of the integrator 118. The emitter of transistor 182 is connected to a biasing circuit comprising voltage dividing resistors 190 connected between a $-7.5$ v. supply and ground. The collector of transistor 182 is connected to a $+7.5$ v. supply through voltage dividing resistors 192. An input of the NOR gate 180 is connected to the point between the voltage dividing resistors 192.

In operation of the hysteresis circuit 122, when the output $\Delta\omega_1$ of the operational amplifier 168 increases from its negative saturation level to $-6.2$ v., the transistor 182 becomes fully conductive causing an input of the NOR gate 180 to become negative. At this point, however, the ouput of the NOR gate 178 is on so that the NOR gate 180 remains off. When the output of the operational amplifier 168 increases to $+0.8$ v., the NOR gate 178 is turned off to open the release valve 28 via NOR gate 126. The turning off of the NOR gate 178 causes the NOR gate 180 to turn on and hold the NOR gate 178 off. When the brake pressure has been released enough to allow the wheel to accelerate the output voltage $\Delta\omega_1$ of the operational amplifier 168 will decrease. The NOR gate 178, however, will remain off until $\Delta\omega_1$ falls below $-6.2$ v. causing the transistor 182 to become non-conductive to consequently apply a positive voltage to an input of the NOR gate 180 to turn it off. Then the NOR gate 178 is enabled to turn on since both inputs have attained low voltage.

The circuit for establishing the deceleration threshold $\alpha_1$ comprises a conductor 130 connected to a brake light switch 193 and to a capacitor 194 which is connected to ground through a voltage dividing resistor 196. The capacitor 194 is also connected through a resistor 198 to the NOR gate 132. When the brake light switch 193 is first closed, the capacitor 194 transmits a positive voltage pulse or brake signal to the NOR gate 132 to turn off that gate and to turn on the NOR gate 134, provided that the output of the NOR gate 180 is off. The deceleration threshold $\alpha_1$ is then at $-2g$. The feedback on conductor 135 to the NOR gate 132 holds the latter off. When the NOR gate 178 turns off and the NOR gate 180 turns on, the NOR gate 134 will turn off to reduce the deceleration threshold $\alpha_1$ to $-1 g$.

The control logic circuit 104 further includes the NOR gate 152 having its input connected to the output of the NOR gate 178. The output of the NOR gate 152 is connected through a bias network comprising, in series, voltage dividing resistors 200 and 202, a diode 204, and a voltage dividing resistor 206 connected at a point between resistor 200 and diode 204 and to a $-7.5$ v. supply. When the NOR gate 152 is off, a negative voltage equivalent to an acceleration of 2g is supplied through diode 204 and resistor 202 to the input of an operational amplifier 208. When, however, the NOR gate 152 is conducting, a positive output voltage is applied to the diode 204 to block conduction of the diode and accordingly, to disable the 2g acceleration signal. A voltage dividing network comprising resistors 210 and 212 is connected between a $+3$ v. supply and a $-7.5$ v. supply to provide through input resistor 214 voltage corresponding to 0.5g acceleration. The input resistors 202 and 214 then comprise the summer 154 of FIG. 4.

THE PRESSURE HOLD CIRCUIT

The input circuit supplies the wheel acceleration signal $\dot{\omega}$ through input resistor 216 to the operational amplifier 208 which is of the type MC1530 for example. Gain resistor 218 in series with an integrating capacitor 220 are connected between the output and input of amplifier 208. A diode 222 is in parallel with the resistor 218 and a further gain resistor 224 is connected from the point between the resistor 218 and the capacitor 220 and ground. The output of amplifier 208 is connected through a limiting resistor 226 to a buffer amplifier 148 of type MC900 for example, which serves not only as a switch responsive to a given voltage level but also as an amplifier and an inverter. The output of the buffer amplifier 148 supplies energizing signals via the amplifier 150 and the output conductor 18 to the hold valve 36 and in addition, supplies an inhibit signal to the input of the NOR gate 126 to close the release valve 28 when the hold valve 36 is closed. It will thus be seen that the operational amplifier and its associated circuitry is like the similar circuitry of the wheel velocity error circuit and comprises a non-linear integrator 144. A diode 228, however, is placed between the input of the operational amplifier 208 and ground to limit the negative input voltage to the integrator 144.

In operation, at the start of the brake pressure release period, NOR gate 152 is turned on by reason of the NOR gate 178 being turned off. This action applies a positive voltage to diode 204 sufficient to make the diode non-conducting which reduces the acceleration threshold $\Delta\omega_2$ from 2.5g to 0.5g. When the wheel is decelerating, causing a large negative voltage, $\dot{\omega}$, the operational amplifier 208 output voltage $\Delta\omega_2$ is at the positive saturation level of $+6.5$ v. While the brake pressure decreases, but the wheel is still decelerating $\dot{\omega}$ remains negative holding the output $\Delta\omega_2$ of the amplifier 208 at $+6.5$ v. During this period, the diode 228 limits the negative voltage at the amplifier 208 input to −0.1 v. to prevent the capacitor 220 from obtaining an excessive charge. When the wheel acceleration signal $\omega$ exceeds the +0.2 v. threshold level $\alpha_2$ corresponding to 0.5 g, the amplifier 208 output voltage starts decreasing until the amplifier 208 output decreases to −0.4 v. The integrator 144 gain is determined by resistors 216, 218 and 224 and capacitor 220 having values of 68K, 20K, 1K and 0.22 mfd. respectively. The components are selected such that a rapid increase in wheel speed of approximately 4 r.p.m. will cause the amplifier 208 output to decrease from +6.5 to +0.8 v. As the amplifier 208 output $\Delta\omega_2$ drops below the +0.8 v. level, the buffer amplifier 148 output turns on to provide an output signal on the conductor 18 and close the hold valve 36. When $\Delta\omega_2$ further decreases to −0.4 v., the diode 222 conducts to short out the resistor 218. This places one end of the capacitors 220 at the amplifier output and reduces the integrator 144 gain by a factor of 21. The effect of this change in gain is to provide sufficient memory so that oscillating wheel speed variations caused by vehicle suspension dynamic effects will not cause the hold valve 36 to open during the brake pressure hold period. This memory capacity is equivalent to a transient wheel speed change of about 80 r.p.m. When the wheel speed nearly recovers to approach a speed synchronous with vehicle speed, the NOR gate 178 is again turned on which causes NOR gate 152 to turn off causing diode 204 to conduct and increase the acceleration threshold $\alpha_2$ to 2.5 g or +1 v. When the wheel acceleration signal $\omega$ falls below the threshold level $\alpha_2$, the amplifier 208 output $\Delta\omega_2$ starts to increase. As the amplifier output voltage $\Delta\omega_2$ increases above the 0.8 v. level, the buffer amplifier 148 turns off which opens the hold valve 36 allowing the brake pressure to increase.

SYSTEM OPERATION

Figure 5:
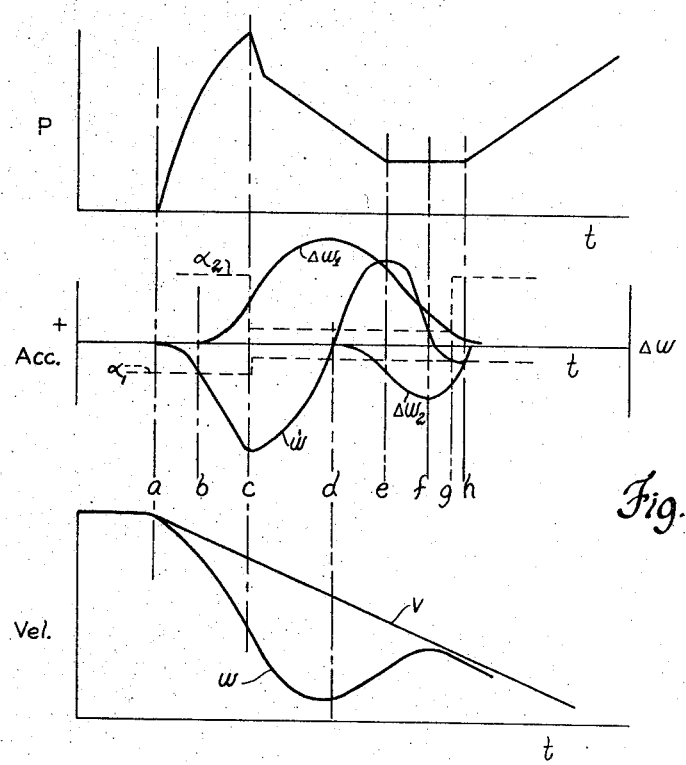
FIG. 5 is a graph depicting various operating parameters of the control system of FIG. 4.

The operation of the brake system and the electronic system is graphically depicted in FIG. 5 wherein the upper graph is a plot of brake pressure P vs. time, the middle graph is a plot of wheel acceleration $\omega$, the deceleration and acceleration thresholds $\alpha_1$ and $\alpha_2$, and the velocity error signals $\Delta\omega_1$ and $\Delta\omega_2$ vs. time, and the lower graph is a plot of wheel velocity $\omega$ and vehicle velocity $v$ vs. time. If the vehicle brakes are applied at time $a$ the brake pressure P begins to increase, and $\omega$ as well as $\omega$ and $v$ begin to decrease. At time $b$ the deceleration $\omega$ drops below the value of the deceleration threshold signal $\alpha_1$ (the sum of the voltages applied through resistors 160, 162 and 164 becomes negative) and the integrator begins to produce an output $\Delta\omega_1$. At time $c$ the value of $\Delta\omega_1$ attains a value sufficient to trigger the hysteresis circuit 122 by turning off the NOR gate 178 and turning on the NOR gate 126 to produce an output thereby detecting an incipient wheel lock-up condition. Then the amplifier 128 is turned on and the release valve 28 is opened to relieve brake pressure, the deceleration threshold signal $\alpha_1$ is reduced from −2g to −1g since the NOR gate 134 is turned on when the NOR gate 178 turns off, and the acceleration threshold signal $\alpha_2$ is reduced from 2.5g to 0.5g since the NOR gate 152 is turned on when the NOR gate 178 turns off.

With the brake pressure relieved $\omega$ begins to increase toward zero. The brake pressure changes rapidly at first due to the action of the accumulator 26. At time $d$ the wheel acceleration $\omega$ reaches zero and the wheel velocity $\omega$ begins to increase. After time $d$ $\omega$ exceeds the acceleration threshold $\alpha_2$ and the integrator 144 produces the signal $\Delta\omega_2$. At time $e$ $\Delta\omega_2$ becomes low enough to trigger the switch 148 to produce an output signal on conductor 18 to close the hold valve 36 to thereby hold the brake pressure constant. At time $f$ $\omega$ decreases to a value less than $\alpha_2$ and $\Delta\omega_2$ starts to increase. At time $g$ the velocity error signal $\Delta\omega_1$ reaches the second switch point of the hysteresis circuit 122 where the transistor 182 stops conducting thus turning off the NOR gate 180 and turning on the output of NOR gate 178. The output of the NOR gate 178 turns off the NOR gate 152 to change the acceleration threshold signal to a value of 2.5 g. This action causes the output $\Delta\omega_2$ of the integrator 144 to increase rapidly until at the time $h$ $\Delta\omega_2$ again operates the switch 148 to remove the signal 18 and to open the hold valve 36 allowing the brake pressure P to increase. By this time, the wheel velocity approaches synchronism with the vehicle velocity $v$ but remains slightly less than vehicle velocity since the most effective braking action occurs for that condition. After point $h$ the cycle will repeat if wheel deceleration $\omega$ again causes an incipient lock-up condition, but since the brake light switches remains closed, the NOR gate 132 remains off and the deceleration threshold signal $\alpha_1$ will remain at the −1 g value to maintain the high incipient lock-up detection sensitivity for subsequent cycles.

In both the velocity error circuit 102 and the pressure hold circuit 106, spurious input signals caused by dynamic suspension effects or by electrical noise are suppressed by the integrators 118 and 144 which tend to average and hence subdue the noise spikes. Moreover, since the brake pressure release and hold signals on conductors 16 and 18 are not produced until some time after the acceleration signal $\omega$ exceeds the threshold signals $\alpha_1$ and $\alpha_2$ an additional protection against such spurious signals is provided. For example, between the times $a$ and $c$, noise in the acceleration signal $\omega$ would not effect switching of the hysteresis circuit 122 to produce a signal on conductor 16 at least until very near time $c$, even if some noise were carried over into the integrated signal $\Delta\omega_1$.

It will be seen then that this innovation provides an anti-lock brake system having exceptionally rapid response to initiate correction of incipient wheel lock-up condition, and effecting pseudo-proportional control of brake pressure with simple on-off valves. The system further has the ability to vary the acceleration and deceleration thresholds to optimize the control function.

The expression "optimum wheel deceleration" in the foregoing specification and accompanying claims has reference to the 1g equivalent value of the threshold $\alpha_1$. It is optimum in the sense that it is determined by the desired rate of vehicle deceleration. Values other than 1g may, of course, be used.

The embodiments of the invention described herein are for purposes of illustration and the scope of the invention is intended to be limited only by the following claims.

It is claimed:

1. In an antilock brake control system for a wheeled vehicle, means for sensing incipient wheel lock-up comprising:
    means for generating a first electrical signal proportional to wheel acceleration,
    means for producing a predetermined fixed deceleration threshold electrical signal which represents optimum wheel deceleration,
    means for summing the first signal and the deceleration threshold signal for producing a composite signal, and
    means for integrating the composite signal for producing an output signal which output signal represents the amount that the time integral of the optimum wheel deceleration exceeds the actual wheel velocity
    whereby the output signal is indicative of incipient wheel lock-up.

2. In an antilock brake control system for a wheeled vehicle, means for sensing incipient wheel lock-up comprising:
    means for generating a first signal proportional to wheel acceleration, means for producing a constant deceleration threshold signal which represents the optimum wheel deceleration, a summing circuit for adding the first signal and the deceleration threshold signal to produce a composite signal, an integrator circuit for integrating the composite signal to produce an output signal, including means for preventing the output signal from exceeding a predetermined value during positive wheel acceleration whereby the output signal is indicative of incipient wheel lock.

3. In an antilock brake control system for a wheeled vehicle, means for sensing incipient wheel lock comprising:

means for generating a first signal proportional to wheel acceleration, means for producing a constant deceleration threshold signal which represents the optimum wheel deceleration, a summing circuit for adding the first signal and the deceleration threshold signal to produce a composite signal, a non-linear integrator circuit for integrating the composite signal to produce an output signal comprising an operational amplifier having connected thereacross capacitance means in series with resistance means, and diode means connected across the resistance means for conducting and changing the integrator gain when the output signal attains a predetermined value, so that the integrator has high sensitivity when the diode means is non-conductive and has a large memory capacity when the diode means is conductive, whereby the output signal is indicative of incipient wheel lock.

4. In an antilock brake control system for a wheeled vehicle, means for providing a brake release signal comprising:

means for generating a first signal proportional to wheel acceleration, means for producing a deceleration threshold signal which is a function of the optimum wheel deceleration, means for summing the first signal and the deceleration threshold signal for producing a composite signal, means for integrating the composite signal for producing an output signal which represents the amount that the optimum wheel velocity exceeds the actual wheel velocity, logic circuit means including a logic element having an output at one logic level only when at least two inputs of a given logic level are present and an output at another logic level when at least one of the inputs of said given logic level are absent, the logic element having the output signal as an input and producing a brake release signal at said another logic level when the output signal attains a predetermined value, and a holding circuit responsive to the brake release signal at said another logic level and to the output signal at a second predetermined value below the first predetermined value and producing a signal to another input of the logic element for maintaining the brake release signal until the output signal decreases to the second predetermined value.

5. In an antilock brake control system for a wheeled vehicle, means for providing a brake release signal comprising:

means for generating a first signal proportional to wheel acceleration, means for producing a constant deceleration threshold signal which is a function of the optimum wheel deceleration, means for summing the first signal and the deceleration threshold signal for producing a composite signal, means for integrating the composite signal for producing an output signal which represents the amount that the optimum wheel velocity exceeds the actual wheel velocity, and a hysteresis circuit means responsive to the output signal to produce a brake release signal when the output signal attains a first predetermined value, said means including a holding circuit actuated at the time of the brake release signal and releasable at a second predetermined value of the output signal lower than the first predetermined value for maintaining the brake release signal until the output signal decreases to the second predetermined value.

6. In an automatic brake control system for a wheeled vehicle an electronic control circuit comprising:

means for generating a wheel signal as a function of wheel velocity, velocity error sensing means operative during vehicle braking for sensing incipient wheel slip and for providing a brake release signal when the wheel velocity becomes less than a pre-programmed reference velocity by a predetermined amount, and a pressure hold circuit means responsive to the wheel signal for providing a pressure hold signal when wheel velocity is increasing and exceeds a second pre-programmed reference velocity by a predetermined amount.

7. In an autmotaic brake control system for a wheeled vehicle an electronic control circuit comprising:

means for generating a wheel signal proportional to wheel acceleration, velocity error sensing means operative during vehicle braking and responsive to the wheel signal for sensing incipient wheel slip and for providing a brake release signal when wheel velocity becomes less than a reference velocity by a predetermined amount, means for generating an acceleration threshold signal representing the optimum wheel acceleration after brake release, a pressure hold circuit means responsive to the wheel signal and the acceleration threshold signal for providing an output signal when wheel velocity is increasing and exceeds a second reference velocity by a predetermined amount, the second reference velocity being a function of the acceleration threshold signal, wherein the pressure hold circuit means includes an integrating circuit having as an input signal the difference of the wheel signal and the acceleration threshold signal and having as an output signal the integral of the said difference, and means responsive to the integrator output signal for producing a pressure hold signal when the integrator output signal reaches a predetermined value.

8. An antilock brake control system for a wheeled vehicle having manually operated brake pressure means connected to brake means including:

brake pressure modulating means for controlling brake pressure including electrically operated on-off valve means, transducer means for sensing wheel rotation and circuit means responsive to the output of the transducer means for operating the on-off valve means comprising:

means connected to the output of the transducer means for developing an input signal, means for producing a threshold signal which is a function of the optimum decelerating wheel velocity profile during braking, means for comparing the input signal and the threshold signal for producing an output signal representing the amount that the optimum decelerating wheel velocity profile at any instant exceeds the actual wheel velocity, and means responsive to the output signal for operating the on-off valve means to reduce brake pressure when the output signal attains a predetermined value.

9. An antilock brake control system as defined in claim 8 wherein the circuit means further comprises:

means for producing a second threshold signal which is a function of the optimum accelerating wheel velocity profile during the period of reduced braking, means for comparing the input signal and the second threshold signal for producing a second output representing the amount that the actual wheel velocity exceeds the optimum accelerating wheel velocity profile at any instant, and means responsive to the second output signal for operating the on-off valve means to maintain the brake pressure when the second output signal attains a predetermined value.

References Cited

UNITED STATES PATENTS

| | | | |
|---|---|---|---|
| 3,245,727 | 4/1966 | Anderson et al. | 303—21(A4) |
| 3,394,967 | 7/1968 | Lucien | 303—21(A4) |
| 3,398,994 | 8/1968 | Smith | 303—21(A4) |
| 3,401,984 | 9/1968 | Williams et al. | 303—21(A4) |

DUANE A. REGER, Primary Examiner

U.S. Cl. X.R.

303—20

PO-1050
(5/69)

UNITED STATES PATENT OFFICE
CERTIFICATE OF CORRECTION

Patent No. 3,554,612        Dated    January 12, 1971

Inventor(s) John L. Harned

It is certified that error appears in the above-identified patent and that said Letters Patent are hereby corrected as shown below:

In Column 1, line 43, "expenesive" should be -- expensive; In Column 4, line 24, "whih" should be -- which -- line 28, delete "will instantly assume a value equal to the velocity of" and insert therefor -- will be zero. When the velocity of the inertia wheel --; Column 5, line 9, both $\omega$'s should be changed to $\dot{\omega}$. In Column 9, line 68, $\omega$ should be $\dot{\omega}$, line 74 $\omega$ should be $\dot{\omega}$; In Column 10, line 15 $\omega$ should be $\dot{\omega}$, line 16, "switches" should be -- switch -- line 28, $\omega$ should be $\dot{\omega}$; In Column 12, Claim 7, line 1, "automtaic" should be -- automatic.

Signed and sealed this 14th day of September 1971.

(SEAL)
Attest:

EDWARD M. FLETCHER, JR.        ROBERT GOTTSCHALK
Attesting Officer               Acting Commissioner of Patent